Nov. 19, 1940.  W. V. THELANDER  2,221,823
CLUTCH PLATE
Filed Oct. 30, 1939  2 Sheets-Sheet 1
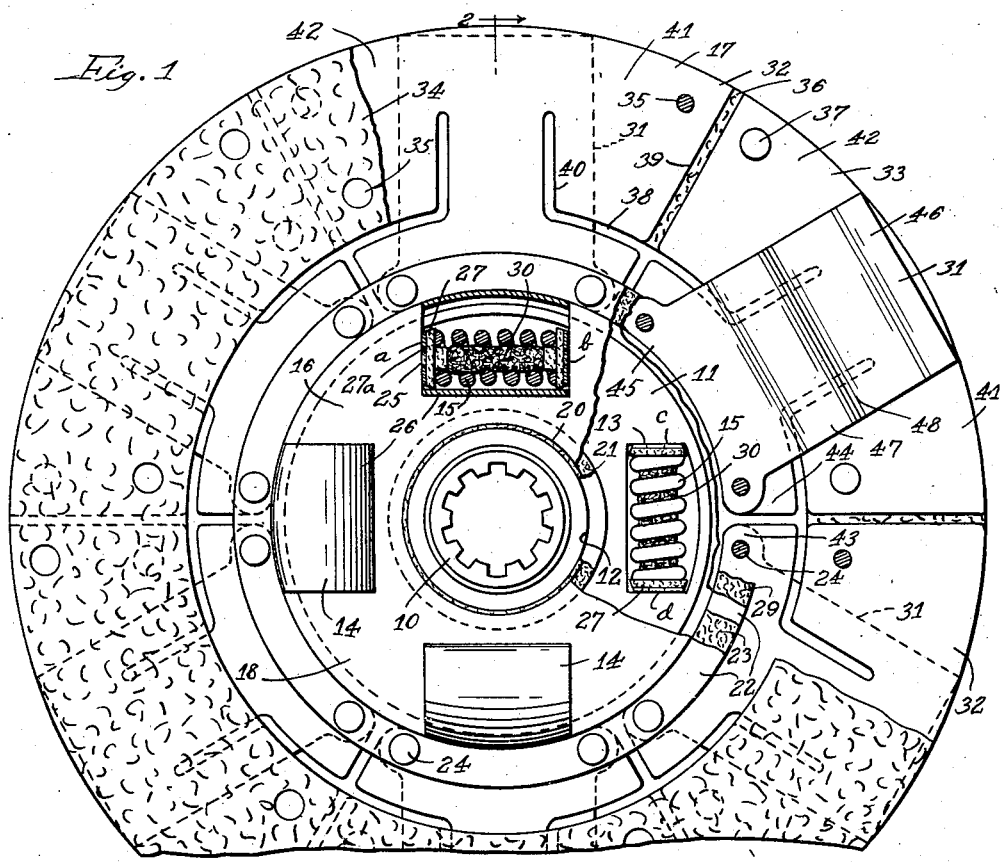
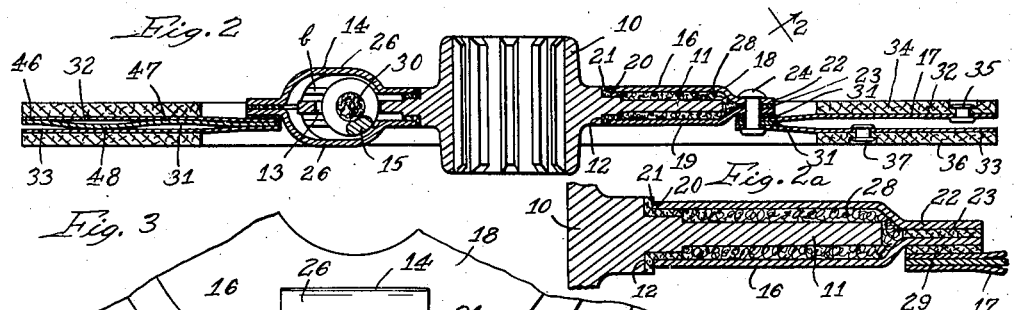
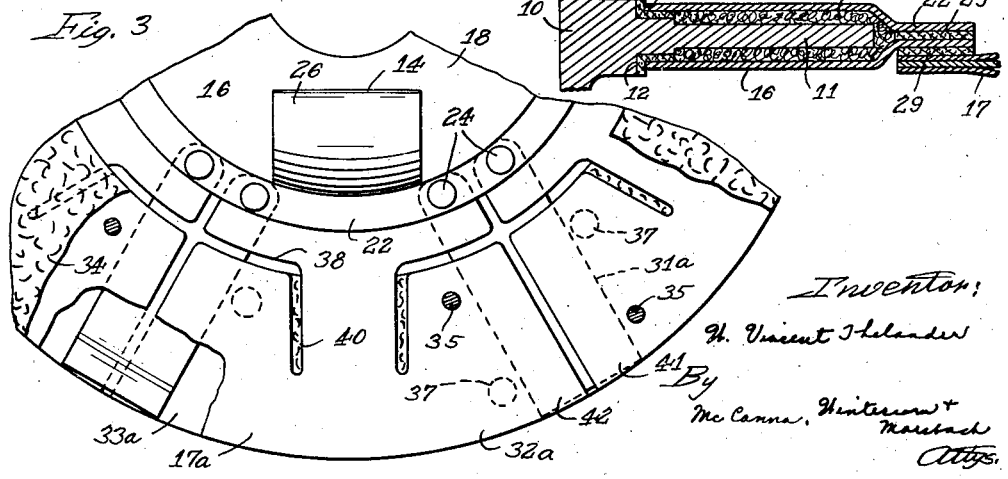

Nov. 19, 1940.  W. V. THELANDER  2,221,823
CLUTCH PLATE
Filed Oct. 30, 1939  2 Sheets-Sheet 2
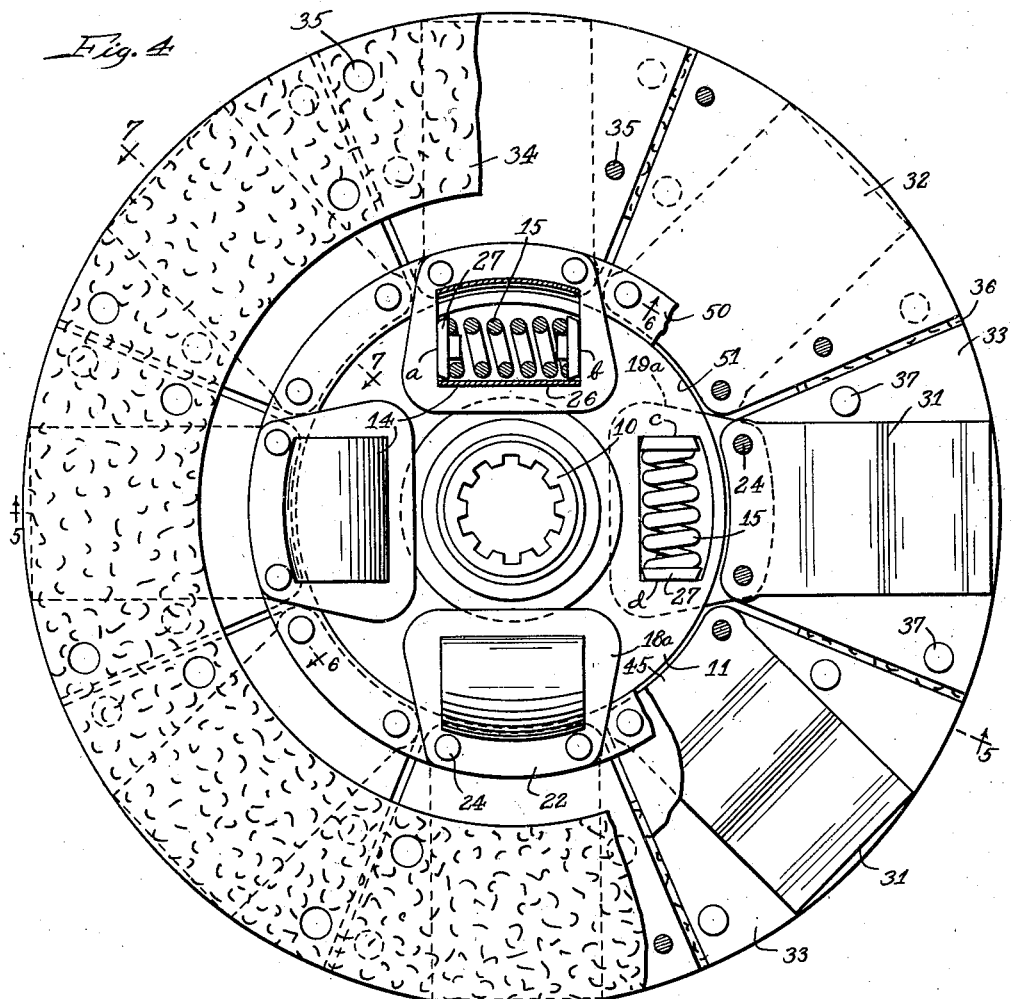
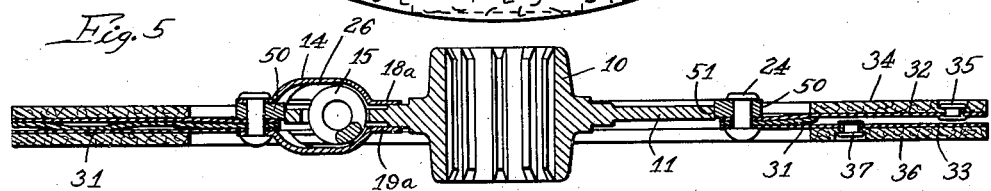
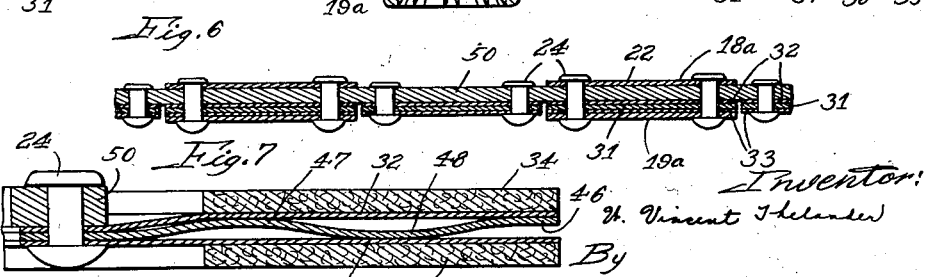

Patented Nov. 19, 1940

2,221,823

UNITED STATES PATENT OFFICE 2,221,823

CLUTCH PLATE

W. Vincent Thelander, Rockford, Ill.

Application October 30, 1939, Serial No. 301,869

21 Claims. (Cl. 192—68)

This invention relates to clutches for motor vehicles and is particularly concerned with improvements in the type of clutch plate disclosed in my copending application Serial No. 189,817, filed February 10, 1938.

The plate disclosed in the application mentioned comprises, briefly stated, a center hub having an annular flange around which are mounted a plurality of plate sections some with portions abutting the front face of the flange and others abutting the rear face to prevent axial displacement of the hub with respect to the plate sections, the plate sections being secured together and carrying rings of friction material on opposite sides thereof and also cooperating with spring means active between the flange on the hub and those portions of the plate sections abutting the same to resiliently transmit drive between the hub and plate sections. Now, while a clutch plate of that construction represents an important advance in the art, by reason of the economy realized by the use of a multiplicity of identical interchangeable small sheet metal stampings which it is possible to produce at greatly reduced cost because of the greatly diminished amount of waste in material, there are nevertheless certain objections to that kind of construction which it is the principal object of my present invention to eliminate, with a view to producing a still better clutch plate at a further reduction in cost.

The clutch plate described requires the forming of substantially semi-cylindrical spring pockets in those portions of the clutch plate sections having abutment with the opposite sides of the hub flange. On the other hand, it is desired to provide a so-called "mush" effect in the marginal mat-holding portions of the plate either by slotting and forming these portions to provide spring tongues or by attaching to these portions spring members to give the desired effect. The attachment of small separate springs involves certain objections besides resulting in added cost, and, on the other hand, if spring steel stock is used and the spring tongues are made integral with the plate sections, there is the further difficulty that spring steel stock tears easily and it is difficult to draw portions thereof to form the spring pockets. Moreover, the subsequent heat treating of the spring steel stock gives rise to considerable difficulty in maintaining flatness of flat sections and uniformity of shape in curved sections, due to distortions incident to heat treating. The salient feature of my invention lies in the provision of a clutch plate of the kind described having the spring pocketed portions of the plate structurally separate and independent of the mat-holding portions but connected together circumferentially with respect to the hub flange, the first portions being of deep draw or mild steel to permit easily drawing the same to provide the spring pockets, whereas the other portions are of spring steel stock suitable for the provision of spring tongues required for the mush effect. In accordance with a further important feature of my invention, the spring tongues are preferably in the form of separate radially disposed wavy springs interposed between the two sets of light sheet metal mat-holding segments keeping the latter normally spaced more than the thickness represented when the wavy springs are flattened upon compression of the plate between a pressure plate and flywheel in the engagement of a clutch. A plate constructed along these lines, besides avoiding the objections mentioned as being present in former constructions, can be produced at lower cost because of the reduction in the amount of spring steel stock required and the use of cheaper mild steel for those portions heretofore made of the spring steel stock.

Another important object of the present invention is to provide a clutch plate which besides being of sectional construction so that there is less tendency for sounding off than in plates where complete rings of sheet metal are provided incorporates sound insulating means at various points where there would otherwise be metal to metal contact, thus minimizing the transmission of vibration between adjacent parts and consequent sounding off thereof.

The invention is illustrated in the accompanying drawings, in which—

Fig. 1 is a face view of a clutch plate made in accordance with my invention, showing two of the spring pockets in outside elevation, a third in longitudinal section, and a fourth broken away to show the registering notch in the hub flange, a portion of the friction mat being also broken away to show the slotting of the mat-holding segments and one of these segments being removed to reveal one of the wavy springs provided for mush effect;

Fig. 2 is a cross-section on the broken line 2—2 of Fig. 1;

Fig. 2a is an enlarged sectional detail of a portion of Fig. 2;

Fig. 3 is a fragmentary face view of another clutch plate showing a modified or alternative construction;

Fig. 4 is a view similar to Fig. 1, showing still another clutch plate;

Fig. 5 is a cross-section on the broken line 5—5 of Fig. 4, and

Figs. 6 and 7 are sectional details on the lines 6—6 and 7—7 of Fig. 4, Fig. 7 being on an enlarged scale.

Similar reference numerals are applied to corresponding parts throughout the views.

Referring first to Figs. 1, 2 and 2a, the clutch plate shown comprises relatively rotatable inner and outer portions, the inner portion being formed by a center hub 10 splined for driving connection with the driving shaft of the transmission and provided with an annular flange 11 onto which the outer portion of the plate is adapted to be assembled in concentric relation with the annular shoulders 12 provided on opposite sides of the enlarged inner portion of the flange 11 in concentric relation with the hub 10. A plurality of openings 13, four in the present instance, are provided in the flange 11 in equally circumferentially spaced relation, one for each of a plurality of spring pockets, indicated generally by the numeral 14. The pockets 14 form housings for the spring cushioning means 15 for resisting relative rotation between the inner and outer portions of the plate, numbered 16 and 17 respectively. The inner portion 16 is formed by two circular sheet metal plates 18 and 19 disposed on opposite sides of the flange 11 having circular center holes 20 for a close working fit on annularly shouldered washers 21 that are made to fit the shoulders 12 on the flange 11. The plates 18 and 19 have annular flanges 22 on the outer periphery thereof, offset toward one another, as clearly appears in Fig. 2, for engagement with the opposite sides of a washer 23 when the plates 18 and 19 are riveted together in assembled relation to the flange 11, as indicated at 24. The plates 18 and 19 are sheared along substantially parallel lines 25 in each of the four quadrants and the metal therebetween is struck outwardly between dies to provide substantially semi-cylindrical open-ended hollow bosses 26 to form the spring pockets 14 previously mentioned, while at the same time providing driving faces a and b at the opposite ends of each spring pocket to cooperate with the opposite ends c and d of the openings 13 in the hub flange 11 and be engaged by the buttons 27 that fit in the opposite ends of the springs 15 housed in the spring pockets. The plates 18 and 19 of course both have the open-ended substantially semi-cylindrical bosses 27 struck therefrom in registering relation as indicated in Fig. 2 so that there are two driving faces a on these two plates on opposite sides of the flange 11 adjacent the driving face c, and likewise two driving faces b on opposite sides of the flange 11 adjacent the driving face d in the case of each of the spring pockets 14. In accordance with one of the objects of the present invention, the washers 21 and 23 are of fiber or other non-metallic wear resisting material. These washers eliminate metal to metal contact between the plate proper and its hub as well as between the two halves of the inner portion 16 of the plate formed by the plates 18 and 19, whereby to minimize the transmission of vibration and accordingly deaden sound. The buttons 27 for a like reason are preferably of fiber or other suitable non-metallic material equipped, as indicated at 27a, with wear resisting washers on the reduced tips thereof. As a further step in the direction of silencing the plate, I may also insert felt washers 28 on opposite sides of the flange 11 to have sound deadening contact with the plates 18 and 19. For a similar reason another washer 29 of fiber or other suitable material may also be provided between the inner and outer portions 16 and 17 of the plate, this washer being perforated at circumferentially spaced points like the washer 23 to take the rivets 24. The coiled compression springs 15 for cushioning the drive may also be filled with wads 30 of cotton batting or any other suitable sound deadening material. In that way these springs are not free as heretofore to sound off and the cotton batting, being inside the springs, does not interfere with their drive cushioning function.

The plates 18 and 19 in accordance with another important object of my invention are made from deep draw mild steel suitable for the forming of the struck out boss portions 26 for the spring pockets 14. With this construction I eliminate the problems above outlined that went with the forming of the pocketed portion of the plate sections integral with the mat-holding portion, all of spring steel stock, in order to have material in the mat-holding portion suitable for the forming of spring tongues required for mush effect. In accordance with the present invention, mush effect is obtained by the provision of a series of separate spring steel elements 31 between two series of mat-holding segments 32 and 33 of very thin mild steel stock. The mat-holding segments 32 and 33 form the outer portion 17 of the plate, the segments 32 forming one annulus onto which a facing ring 34 of suitable composition material, usually containing asbestos, is fastened as by rivets 35, the other segments 33 forming another annulus for supporting another ring 36 of facing material fastened to the segments by rivets 37. The segments 32 and 33 are all slotted arcuately as at 38 inwardly from the opposed radial edges 39 and transversely along two parallel lines, parallel to and equally spaced on opposite sides of a radius through the middle of the segment, as at 40, so as to make the segment generally T-shaped providing two tongue or wing portions 41 and 42 at the opposite ends of the cross portion of the T easily flexible with respect to the rest of the segment. It will be noticed that the tongue portions 41 and 42 have the rivets 35 and 37 therein for attaching the facing rings 34 and 36 to the segments 32 and 33 respectively and that the spring steel mush elements 31 are disposed radially between the two rivets on each segment, thus avoiding any interference with the compression of the outer portion 17 of the plate between the fly wheel and pressure plate, even though the rivets 35 and 37 have their heads projecting slightly from the inner faces of the segments 32 and 33 as indicated in Fig. 2. It will also be noticed that the segments 32 and 33 have the rivets 35 and 37 arranged in two concentric circular series near the inner and outer peripheries of the facing rings 34 and 36 and that there are only two rivets joining each segment to the associated facing ring, one rivet being in the outer series and passing through one of the tongues 41 and 42 and the other rivet being in the inner series and passing through the other of said tongues, the rivets being at diagonally opposite corners of the outer tongued mat-holding portion of each segment as clearly illustrated in Fig. 1. This construction, using very thin mat-holding segments which moreover are slotted to give the segments a generally T- shaped form for increased flexibility of the cross portion on which the facing ring is attached, has beeen devised with a two fold purpose in view: That of assuring good mush effect by the cooperation of the spring steel elements 31 with the opposed mat-holding segments, and that of assuring the parallelism of the outer faces of the rings 34 and 36 of facing material so that they will have full engagement with the coacting flat parallel surfaces on the fly-wheel and pressure plate on the clutch. The facing rings 34 and 36 in other words are stiff enough in relation to the thin and easily flexible tongue portions 41 and 42 of the mat-holding segments 32 and 33 so that the segments conform themselves to the rings 34 and 36 instead of the opposite being true. The segments 32 and 33 have flat arcuate attaching portions 43 and 44 formed by their inner marginal edge portions and these engage on opposite sides of the flat arcuate attaching portions 45 provided on the inner marginal edge portions of the spring steel mush elements 31, and two rivets 24 serve to fasten each pair of related segments 32 and 33 with their intermediate related spring element 31 to the flanges 22 of the plates 18 and 19 forming the inner portion 16 of the plate. The spring steel mush elements 31 are of wavy form radially so as to provide radially spaced portions 46 and 47 in one plane on one side of the plane of the attaching portion 45, and another portion 48 between the portions 46 and 47 in another plane on the opposite side of the plane of the attaching portion 45 as clearly appears in Fig. 2, the portions 46, 47, and 48 all coming within the radial width of the facing rings 34 and 36 with the portion 48 lying substantially midway between the inner and outer peripheries thereof. The mush elements 31 are adapted to flatten out under clutch engaging pressure and being fastened only at their inner ends by their attaching portions 45 are, of course, under no restraint but are free to contract and expand radially with respect to the abutting mat-holding segments 32 and 33 as pressure is applied and released in the engagement and disengagement of the clutch. Here again the fact that the facing rings 34 and 36 have greater stiffness than the tongued segments 32 and 33 and are held apart by the wide spring steel mush elements 31, centrally disposed with respect to the segments, assures full engagement of the facing rings with the fly-wheel and pressure plate, thereby avoiding slippage and making for long life. In many previous constructions where the spring mush elements gave too localized pressure on the facing rings, the plate would wear in spots and in a short time those portions where the springs were active would wear down to such an extent that the mush effect gradually disappeared and finally virtually no mush effect remained. The fact that so little weight is concentrated toward the outer periphery of the plate in the present construction, due to the use of very thin segments 32 and 33, is also of advantage in reducing spinning time and accordingly generally improving clutch action.

Fig. 3 illustrates a clutch plate of similar construction, having mat-holding segments 32a and 33a forming the outer portion 17a of the clutch plate and riveted in place as at 24 similarly as in the construction just described, the segments also having facing rings 34 and 36 secured thereto by rivets 35 and 37 as in the other construction. In this plate, however, narrower spring steel mush elements 31a are provided of wavy form radially, as in the case of the mush elements 31, but disposed radially in bridging relation to the adjoining edge portions of neighboring segments and in a plane between the planes of the two sets of segments 32a and 33a. Each mush element 31a lies radially between the rivets 35 on neighboring segments 32a as well as between the rivets 37 on the corresponding segments 33a of the other set, and it is thought that with this relationship of the mush elements to the tongue portions 41 and 42 of neighboring segments there will be more efficient mush action. Two rivets 24 serve to fasten each mush element in place as shown.

The clutch plate illustrated in Figs. 4 to 7 closely resembles that shown in Fig. 1 but has a plurality of spring pocket plates 18a in place of the plate 18 and likewise another series of spring pocket plates 19a taking the place of the plate 19. The two series of plates 18a and 19a are interconnected by a ring 50 which has a close working fit on the circular periphery 51 of the flange 11 of the hub 10, the rivets 24 used for fastening the plates 18a and 19a in place being entered through the ring 50 and through the attaching portions on the inner marginal edges of the mat-holding segments 32 and 33 and the intermediate spring steel mush elements 31 as shown. There are four sets of mat-holding segments 32 and 33 and interposed mush elements 31 attached to the ring 50 in that way, and four other sets of mat-holding segments 32 and 33 together with their interposed mush elements 31 fastened directly to the ring 50 at circumferentially spaced points between the spring pockets 14, also using rivets 24 as shown, the plate illustrated being made up of eight sets of mat-holding segments.

The principal advantage of this construction over that of Fig. 1 lies in the fact that the plates 18a and 19a are interchangeable and can be produced at lower cost due to the decreased amount of waste in material in their production. With this construction as with that of Figs. 1 and 3 deep draw mild steel is, of course, used in the plates 18a and 19a and likewise also in the mat-holding segments 32 and 33, the latter being preferably quite thin for the reasons previously mentioned, and the mush elements 31 being of spring steel stock to give the performance desired. In all three constructions, then, it is obvious that the springs relied upon for mush effect are protected against overheating by reason of the fact that the facing rings through which the heat is transmitted in the operation of the clutch, are shielded from the springs 31 or 31a, as the case may be, by the mat-holding segments. There is, therefore, no danger of the springs losing tension.

It is believed the foregoing description conveys a good understanding of the objects and advantages of my invention. The appended claims have been drawn to cover all legitimate modifications and adaptations.

I claim:

1. A clutch plate comprising a center hub having an annular flange, two series of clutch plate sections circumferentially arranged around the flange, a series of leaf-spring elements circumferentially arranged around the flange between said clutch plate sections to urge the same apart, the flange having circumferentially spaced openings provided therein, spring means disposed in said openings for resiliently transmitting drive between the plate sections and the flange, said plate sections being adapted to carry friction material on the radially outer portions thereof, spring housing plates disposed on opposite sides of the flange covering the openings therein and enclosing said spring means, said housing plates having engagement with the spring means to transmit drive between the plate sections and flange and having the radially outer portions thereof overlapping the radially inner portions of the plate sections and leaf-spring elements, and means for securing the plate sections and leaf-spring elements together and to said spring housing plates to form an annulus concentric with the hub and flange.

2. A clutch plate comprising a center hub having an annular flange, two series of clutch plate sections circumferentially arranged around the flange, a series of leaf-spring elements circumferentially arranged around the flange between said clutch plate sections to urge the same apart, the flange having circumferentially spaced openings provided therein, spring means disposed in said openings for resiliently transmitting drive between the plate sections and the flange, spring housing plates disposed on opposite sides of the flange covering the openings therein and enclosing said spring means, said housing plates having engagement with the spring means to transmit drive between the plate sections and flange and having the radially outer portions thereof overlapping the radially inner portions of the plate sections and leaf-spring elements, means for securing the plate sections and leaf-spring elements together and to said spring housing plates to form an annulus concentric with the hub and flange, and rings of friction material supported on opposite sides of said annulus in substantially concentric relation with the hub and each secured to one series of said plate sections.

3. A clutch plate comprising a center hub having an annular flange, two series of clutch plate sections circumferentially arranged around the flange, a series of leaf-spring elements circumferentially arranged around the flange between said clutch plate sections to urge the same apart, the flange having circumferentially spaced openings provided therein, spring means disposed in said openings for resiliently transmitting drive between the plate sections and the flange, said plate sections being adapted to carry friction material on the radially outer portions thereof, a plurality of circumferentially spaced spring housing plates disposed on opposite sides of the flange covering the openings and enclosing said spring means, said housing plates being arranged for engagement with the spring means to transmit drive between the plate sections and flange, said spring housing plates having the radially outer portions thereof overlapping the radially inner portions of the plate sections and leaf-spring elements, and means for securing the plate sections and leaf-spring elements together and to said spring housing plates to form an annulus concentric with the hub and flange.

4. A clutch plate comprising a center hub having an annular flange, two series of clutch plate sections circumferentially arranged around the flange, a series of leaf-spring elements circumferentially arranged around the flange between said clutch plate sections to urge the same apart, the flange having circumferentially spaced openings provided therein, spring means disposed in said openings for resiliently transmitting drive between the plate sections and the flange, a plurality of circumferentially spaced spring housing plates disposed on opposite sides of the flange covering the openings and enclosing said spring means, said housing plates being arranged for engagement with the spring means to transmit drive between the plate sections and flange, said spring housing plates having the radially outer portions thereof overlapping the radially inner portions of the plate sections and leaf-spring elements, means for securing the plate sections and leaf-spring elements together and to said spring housing plates to form an annulus concentric with the hub and flange, and rings of friction material supported on opposite sides of said annulus in substantially concentric relation with the hub and each secured to one series of said plate sections.

5. A clutch plate comprising a center hub having an annular flange, two series of clutch plate sections circumferentially arranged around the flange, a series of leaf-spring elements circumferentially arranged around the flange between said clutch plate sections to urge the same apart, the flange having circumferentially spaced openings provided therein, spring means disposed in said openings for resiliently transmitting drive between the plate sections and the flange, said plate sections being adapted to carry friction material on the radially outer portions thereof, a plurality of circumferentially spaced spring housing plates disposed on opposite sides of the flange covering the openings and enclosing said spring means, said housing plates being arranged for engagement with the spring means to transmit drive between the plate sections and flange, said spring housing plates having the radially outer portions thereof overlapping the radially inner portions of the plate sections and leaf-spring elements, a ring encircling the periphery of the hub flange and movable rotatably with respect thereto, and means for securing the spring housing plates to said ring and for securing the plate sections and leaf-spring elements together and to said ring to form an annulus concentric with the hub and flange.

6. A clutch plate comprising a center hub having an annular flange, two series of clutch plate sections circumferentially arranged around the flange, a series of leaf-spring elements circumferentially arranged around the flange between said clutch plate sections to urge the same apart, the flange having circumferentially spaced openings provided therein, spring means disposed in said openings for resiliently transmitting drive between the plate sections and the flange, a plurality of circumferentially spaced spring housing plates disposed on opposite sides of the flange covering the openings and enclosing said spring means, said housing plates being arranged for engagement with the spring means to transmit drive between the plate sections and flange, said spring housing plates having the radially outer portions thereof overlapping the radially inner portions of the plate sections and leaf-spring elements, a ring encircling the periphery of the hub flange and movable rotatably with respect thereto, means for securing the spring housing plates to said ring and for securing the plate sections and leaf-spring elements together and to said ring to form an annulus concentric with the hub and flange, and rings of friction material supported on opposite sides of said annulus in substantially concentric relation with the hub and each secured to one series of said plate sections.

7. A clutch plate comprising a center hub having an annular flange, two series of clutch plate sections circumferentially arranged around the flange, a series of leaf-spring elements disposed in circumferentially spaced relation around the flange between the two series of plate sections to urge the same apart, each leaf-spring element being disposed overlapping the adjoining ends of neighboring plate sections, the flange having circumferentially spaced openings provided therein, spring means disposed in said openings for resiliently transmitting drive between the plate sections and the flange, said plate sections being adapted to carry friction material on the radially outer portions thereof, spring housing plates disposed on opposite sides of the flange covering the openings therein and enclosing said spring means, said housing plates having engagement with the spring means to transmit drive between the plate sections and flange and having the radially outer portions thereof overlapping the radially inner portions of the plate sections and leaf-spring elements, means for securing the plate sections and leaf-spring elements together and to said spring housing plates to form an annulus concentric with the hub and flange.

8. A clutch plate comprising a center hub having an annular flange, two series of clutch plate sections circumferentially arranged around the flange, a series of leaf-spring elements disposed in circumferentially spaced relation around the flange between the two series of plate sections to urge the same apart, each leaf-spring element being disposed overlapping the adjoining ends of neighboring plate sections, the flange having circumferentially spaced openings provided therein, spring means disposed in said openings for resiliently transmitting drive between the plate sections and the flange, spring housing plates disposed on opposite sides of the flange covering the openings therein and enclosing said spring means, said housing plates having engagement with the spring means to transmit drive between the plate sections and flange and having the radially outer portions thereof overlapping the radially inner portions of the plate sections and leaf-spring elements, means for securing the plate sections and leaf-spring elements together and to said spring housing plates to form an annulus concentric with the hub and flange, and rings of friction material supported on opposite sides of said annulus in substantially concentric relation with the hub and each secured to one series of said plate sections.

9. A clutch plate as set forth in claim 1, wherein each of the clutch plate sections is of segmental form and slotted so that the radially outer portion carrying the friction material is generally T-shaped so as to provide independently flexible tongue portions on the opposite ends of the cross-portion of the T, the friction material being attached to said tongue portions.

10. A clutch plate as set forth in claim 2, wherein each of the clutch plate sections is of segmental form and slotted so that the radially outer portion carrying the friction material is generally T-shaped so as to provide independently flexible tongue portions on the opposite ends of the cross-portion of the T, the rings of friction material being secured to the tongue portions of the two series of plate sections and having sufficient inherent stiffness to flex the tongue portions more or less according to the spacing of the plate sections by the leaf-spring elements, whereby said rings are maintained in parallel relationship.

11. A clutch plate as set forth in claim 7,
wherein each of the clutch plate sections is of segmental form and slotted so that the radially outer portion carrying the friction material is generally T-shaped so as to provide independently flexible tongue portions on the opposite ends of the cross-portion of the T, the friction material being attached to said tongue portions.

12. A clutch plate as set forth in claim 8, wherein each of the clutch plate sections is of segmental form and slotted so that the radially outer portion carrying the friction material is generally T-shaped so as to provide independently flexible tongue portions on the opposite ends of the cross-portion of the T, the rings of friction material being secured to the tongue portions of the two series of plate sections and having sufficient inherent stiffness to flex the tongue portions more or less according to the spacing of the plate sections by the leaf-spring elements, whereby said rings are maintained in parallel relationship.

13. A clutch plate comprising a metallic center hub having an annular flange provided with annular shoulders on opposite sides thereof, an annulus for mounting friction material disposed in concentric relation with the flange, the flange having circumferentially spaced openings provided therein, spring means disposed in said openings for resiliently transmitting drive between the annulus and the flange, metallic spring housing plates disposed on opposite sides of the flange covering the openings and enclosing said spring means and arranged for engagement with the latter to transmit drive between the annulus and flange, non-metallic sound deadening washers fitting on the annular shoulders on said flange and in circular openings provided therefor in said housing plates to support the latter on the flange without metal to metal contact, said housing plates having the radially outer portions thereof overlapping the radially inner portions of the annulus, non-metallic sound insulating means interposed between said overlapping portions, and means for securing the annulus to said spring housing plates.

14. A clutch plate as set forth in claim 13, including non-metallic sound insulating material interposed between the radially outer portions of the spring housing plates.

15. A clutch plate as set forth in claim 13, including non-metallic sound deadening material interposed between the opposite sides of the flange and the spring housing plates.

16. A clutch plate as set forth in claim 13, wherein the spring means for resiliently transmitting drive between the plate sections and the flange comprises coiled compression springs, said clutch plate including wads of non-metallic sound deadening material inserted in said springs.

17. A clutch plate comprising a center hub having an annular flange, two series of clutch plate sections of thin flexible sheet metal circumferentially arranged around the periphery of the flange, a plurality of leaf-spring elements of sheet spring material circumferentially arranged around the flange between the clutch plate sections to urge the same apart, said flange having openings provided therein in circumferentially spaced relation, spring housing plates made from other sheet material disposed on opposite sides of said flange having spring housing portions struck from the planes thereof at circumferentially spaced points and registering with the openings in the flange, spring means in said openings enclosed by said housing portions and active between the flange and housing plates for resiliently transmitting drive between the plates and hub, said clutch plate sections and leaf-spring elements having flat radially inner edge portions for attachment thereof to said spring housing plates, means for securing said spring housing plates and clutch plate sections with the leaf-spring elements therebetween together as a unitary assembly for relative rotary movement with respect to the hub flange, said leaf-spring elements having the radially outer portions thereof formed to provide yieldable resilient portions axially spaced relative to the plane of the flat radially inner edge portions thereof, and rings of friction facing material supported on opposite sides of the annulus formed by said clutch plate sections in substantially concentric relation with the hub and each secured to one series of clutch plate sections.

18. A clutch plate as set forth in claim 17, wherein each of the clutch plate sections has the radially outer end portion for mounting the friction facing material thereon slotted so that said portion is substantially T-shaped, providing independently flexible tongue portions on opposite ends of the cross-portion of the T, the facing material being attached to the tongue portions.

19. A clutch plate as set forth in claim 17, wherein each of the clutch plate sections has the radially outer end portion for mounting the friction facing material thereon slotted so that said portion is substantially T-shaped, providing independently flexible tongue portions on opposite ends of the cross-portion of the T, the facing material being attached to the tongue portions, and wherein the leaf-spring elements are disposed in overlapping relation to the adjoining ends of neighboring clutch plate sections to flex the tongue portions relative to the other portions of the plate sections.

20. A clutch plate comprising a center hub, two series of clutch plate sections circumferentially arranged around the hub, a series of leaf-spring elements circumferentially arranged around the hub between the plate sections to urge the latter apart, means for securing the plate sections and leaf-spring elements together at their radially inner portions and mounting the same on the hub so as to form an annulus substantially concentric with the hub, rings of friction material arranged to be mounted on the annulus, one on the outer faces of each series of plate sections, and rivets for securing each ring of friction material to its associated series of plate sections, the rivets being located in respect to each plate section on opposite sides of the leaf spring element cooperating with the plate section, the leaf-spring elements being disposed substantially radially with respect to said plate sections.

21. A clutch plate as set forth in claim 13 wherein the spring means for resiliently transmitting drive between the plate sections and the flange comprise coiled compression springs, the clutch plate including buttons of non-metallic sound insulating material abutting the ends of said springs to prevent metal to metal contact between the springs and the spring housing plates and flange.

W. VINCENT THELANDER.